Nov. 13, 1962

J. D. ALLEN, JR 3,063,537

FORMAT CONTROL DEVICE

Filed July 5, 1960

INVENTOR.
JAMES D. ALLEN Jr.

BY Fraser and Bogucki

ATTORNEYS

Nov. 13, 1962  J. D. ALLEN, JR  3,063,537
FORMAT CONTROL DEVICE
Filed July 5, 1960  7 Sheets-Sheet 2
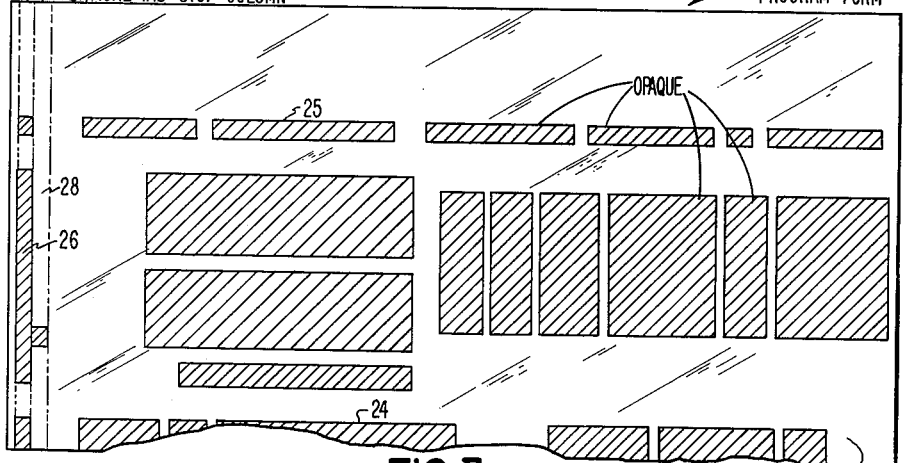
FIG. 2
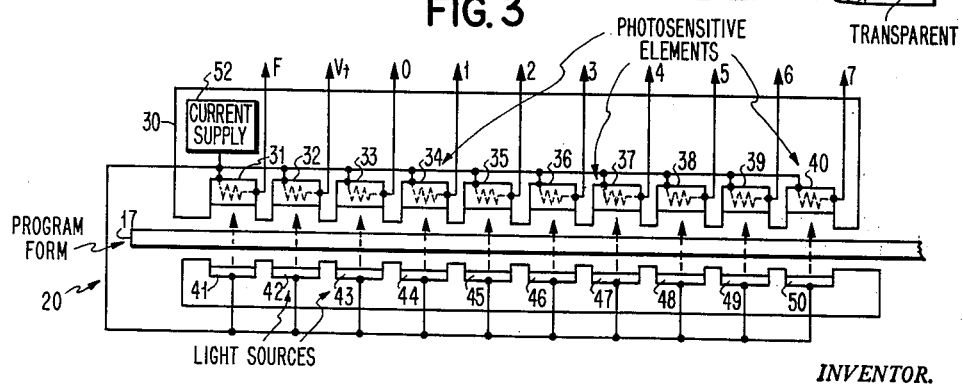
FIG. 3
FIG. 4
INVENTOR.
JAMES D. ALLEN Jr.
BY Fraser and Bogucki
ATTORNEYS

*INVENTOR.*
JAMES D. ALLEN Jr.
BY
*Fraser and Bogucki*
ATTORNEYS

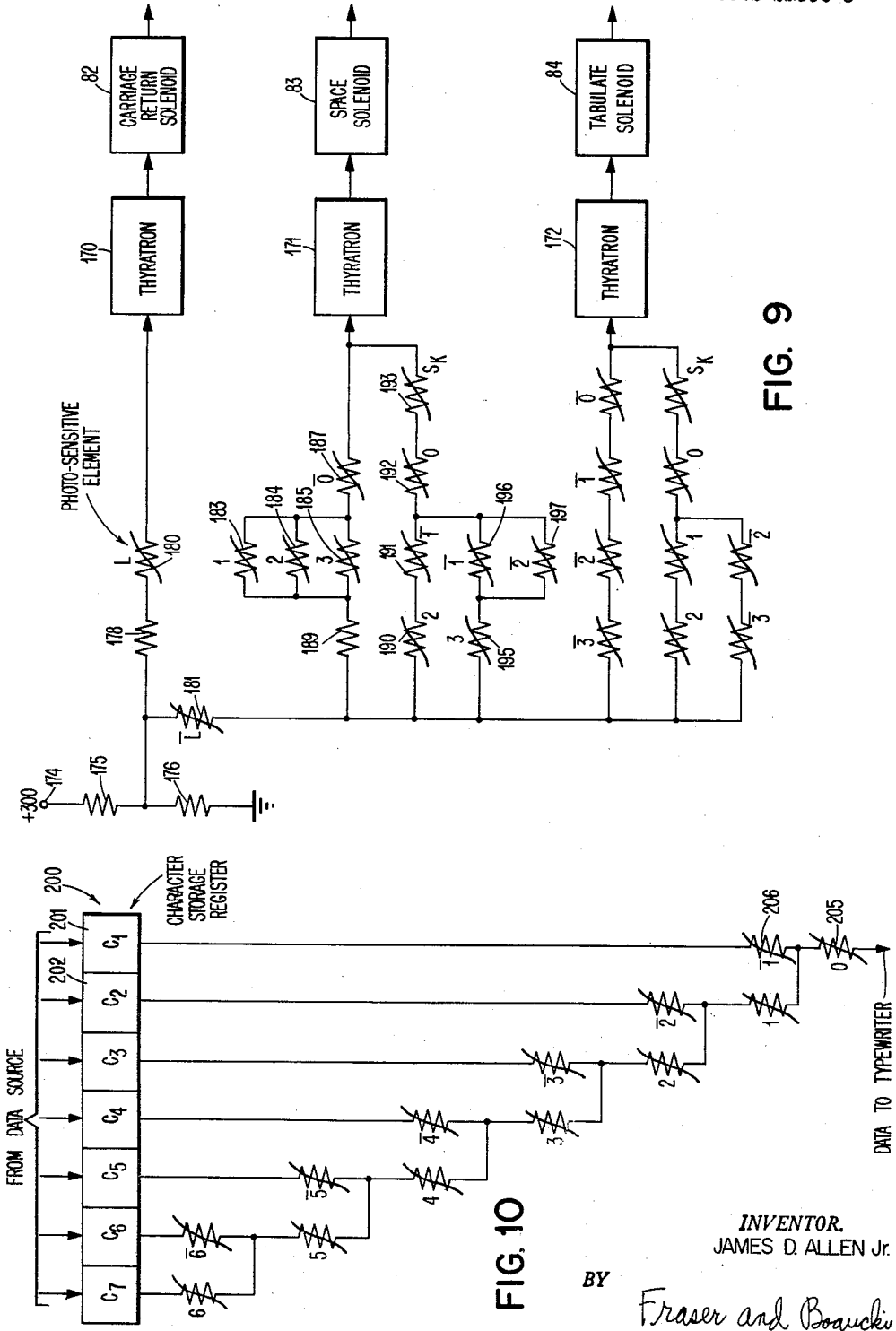

Nov. 13, 1962 J. D. ALLEN, JR 3,063,537
FORMAT CONTROL DEVICE
Filed July 5, 1960 7 Sheets-Sheet 7
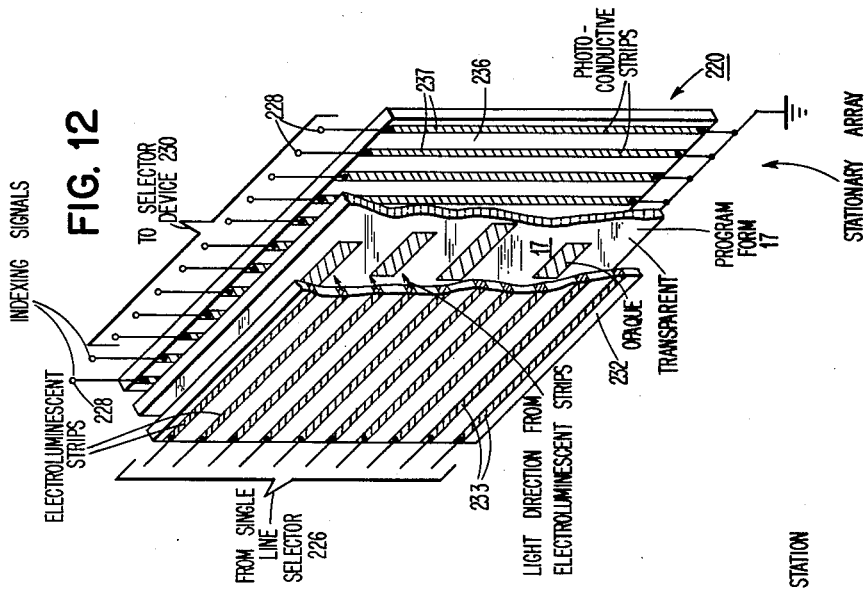
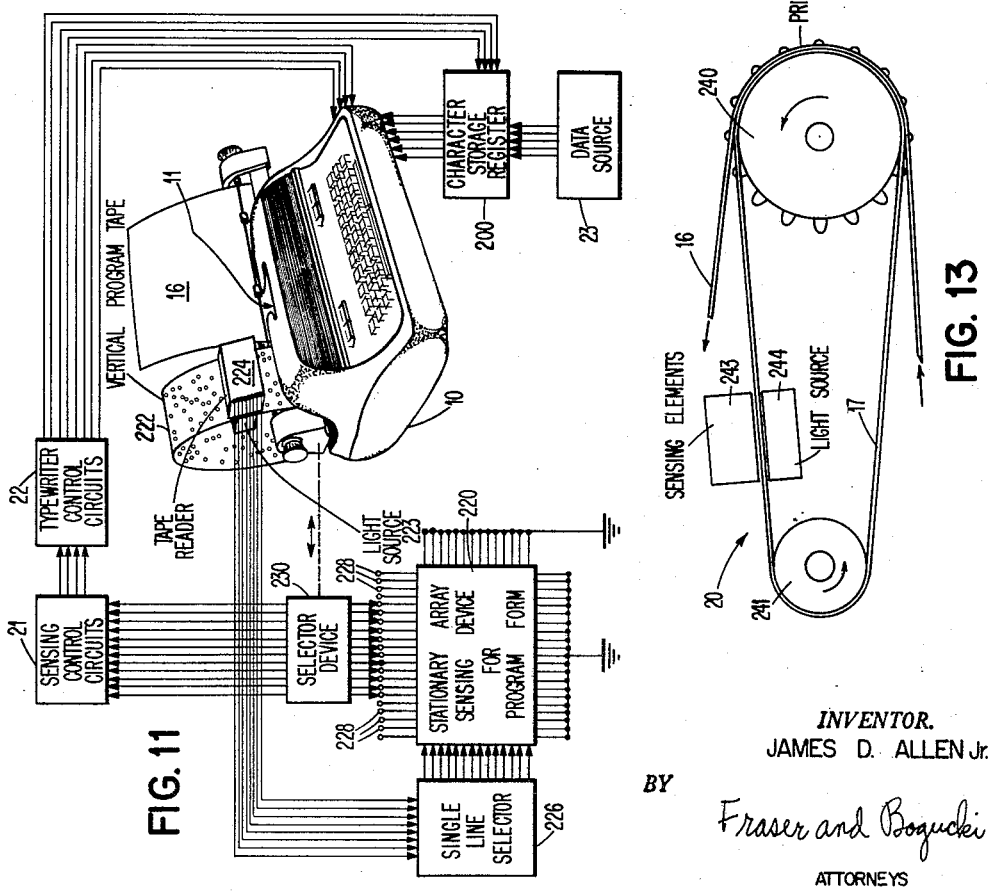
INVENTOR.
JAMES D. ALLEN Jr.
BY
Fraser and Bogucki
ATTORNEYS

United States Patent Office 3,063,537
Patented Nov. 13, 1962

3,063,537
FORMAT CONTROL DEVICE
James D. Allen, Jr., Los Gatos, Calif., assignor to International Business Machines Corporation, New York, N.Y., a corporation of New York
Filed July 5, 1960, Ser. No. 40,581
16 Claims. (Cl. 197—19)

This invention relates to format control devices and more particularly to a device for automatically controlling the printing format of a printing device such as a typewriter.

In data processing systems, an automatic typewriter or printer is frequently employed as an output device by means of which data in the form of characters, numbers, symbols or words may be written on the surface of a sheet of paper. In many instances, the data must be disposed on the sheet in a particular format which may be divided into separate printing fields within which different types of information are written.

Systems now in general use for controlling the printing format of an automatic typewriter leave much to be desired from the standpoint of simplicity and efficiency of operation. Where a typewriter operates as an output printer for a data processing system, the system itself generally must be programmed to provide individual instructions to the typewriter controls concerning line spacing, horizontal tabulation, carriage return and vertical tabulation. Thus, the program of the computer must include information as to the position of the typewriter carriage at all times in addition to the detailed combination of line spacing and tabulating commands necessary to properly position the typewriter in the desired sequence of operation.

Accordingly, it is an object of this invention to provide an improved typewriter control device.

It is another object of this invention to provide a device for automatically controlling the format of a printing device.

It is a further object of this invention to provide an improved output printer for a computer.

In accordance with one aspect of the invention, the operation of a printer is controlled to follow a desired format stored on a program form. The program form has optical indicia thereon indicative of horizontal and vertical format data. The program form is optically scanned and the signals which are generated in accordance with the indicia govern the operation of the printer to effect relative horizontal and vertical movement between the work form and the print station so that the disposition of the printing on the printed form corresponds with the horizontal and vertical format data.

In accordance with another aspect of the invention, information may be derived from the indicia of a program form for controlling an electric typewriter employed as an output printer with a data processing system. The program form may consist of a transparent sheet bearing opaque marks indicating printing field in which data is to be entered. A scanning device may be electrically or mechanically coupled to the movement of the carriage so as to read the pattern on the program form at a point corresponding to the point on the work form which is opposite the print station of the typewriter. Control signals may be generated, in accordance with the program form, to actuate the carriage return, tabulate and spacing controls of the typewriter.

In accordance with other aspects of this invention, the program form may be provided with index marks by which the successive lines may readily be selected. Further, a number of successive column positions may be scanned simultaneously, and rapid but accurate horizontal tabulation may be obtained by stopping the carriage mechanism during the tabulation action.

According to still other aspects of the invention, other program forms and scanning mechanisms may be employed, including a stationary array of electroluminescent and photosensitive elements. Further, electro-optical circuits and circuit arrangements having particular utility in printing format control systems may be utilized.

A better understanding of the invention may be had from a reading of the following description and an inspection of the drawings, in which:

FIG. 2 is a simplified representation of a part of a work form which may be used in the arrangement of FIG. 1;

FIG. 3 is a representation of a program form which may be employed in the arrangement of FIG. 1;

FIG. 4 is a diagrammatic illustration of a sensing device which may be employed in the arrangement of FIG. 1;

FIG. 9 is a combined schematic and block diagram of electro-optical circuits which may be employed in control circuits in accordance with the invention;

FIG. 10 is a diagram of storage and switching circuits which may be employed in a system in accordance with the invention;

FIG. 11 is a combined block diagram and perspective representation of a system in accordance with the invention utilizing a stationary array sensing device;

FIG. 12 is a perspective view, partially broken away, of a stationary array which may be employed in the arrangement of FIG. 11; and FIG. 13 is a side view of a fragment of an alternative configuration for the work form, program form, and sensing device of the arrangement of FIG. 1.

Figure 1:
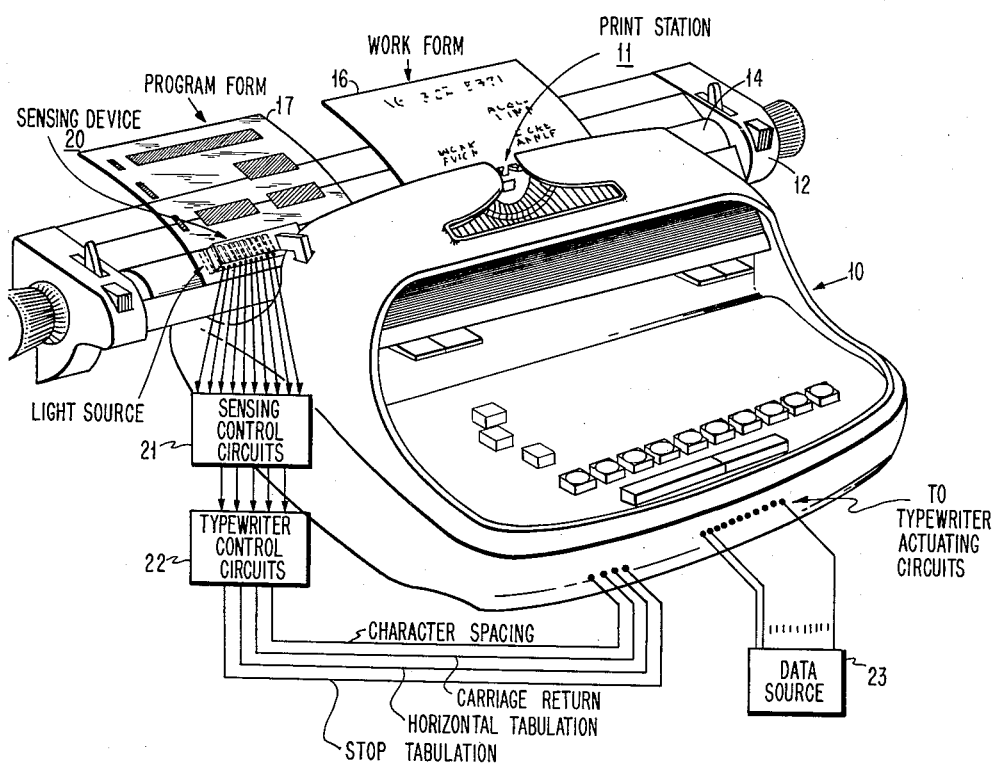
FIG. 1 is a simplified combined perspective and block diagram representation of one format control system in accordance with the invention, employing a work form, a program form, a sensing device and control circuits.

Referring now to the drawings, there is shown in FIG. 1 a simplified combined view, partially in perspective and partially in block diagram form, of a system in accordance with the invention for automatically controlling the printing format of a printing device. The printing device in this example is an electric typewriter 10 which may be operated either manually or by control signals. The typewriter 10 has a conventional print station 11 at which the typewriter type bars act on a document. An extended carriage 12 is utilized, including a platen 14 on which may be placed both a work form or document 16 and a program form 17. The program form 17 is basically a transparent sheet including selectively disposed opaque areas. The contrasting opaque and transparent areas on the program form 17 are sensed by a sensing device 20 which includes light sources and optical sensing means on opposite sides of the program form 17, these being held in fixed relation to the frame of the typewriter 10.

The sensing device 20 includes a number of photosensitive elements, each of which provides signals on a different one of a group of parallel output conductors to sensing control circuits 21 which in turn are coupled to the typewriter control circuits 22. Various output conductors from the typewriter control circuits 22 are coupled internally into the circuits of the typewriter 10 to provide "character spacing," "carriage return," "horizontal tabulation" and "stop tabulation" signals. Printing by the typewriter 10 is effected under the control of signals from a data source which is coupled by a group of conductors to the control solenoids of the different character keys and control elements of the typewriter 10.

To briefly summarize the operation of a printing control system in accordance with the invention, the definition of the printing format is established by the opaque indicia on the program form 17. As character signals are provided from the data source 23 the typewriter 10 prints on a work form 16 at the part of the work form 16 then disposed at the print station 11. The program form 17 concurrently moves in fixed relation to the work form 16 and is scanned for transparent and opaque areas by the sensing device 20. Signals on the different output conductors from the sensing device 20 are converted, by the sensing control circuits 21 and the typewriter control circuits 22 into actuating signals for automatically effecting the desired horizontal and vertical positioning of the work form 16. The program form 17 remains outside the printing station 11 at all times during the printing operation in the particular arrangement of FIG. 1.

A typical business form may comprise the work form 16, a part of which is shown in detail in FIG. 2. The work form 16 is divided into a number of printing areas or "fields," such as those designated as the "Customer's Reference" and "Feature Description" fields, within which fields separately categorized items of data are to be inserted. The relative locations and configurations of all the fields on the work form 16 determine the desired format. It will readily be apparent that a complicated set of instructions would otherwise have to be programmed into the data provided by the data source 23 in order to establish a printing format corresponding to that shown on the form 16.

The program form 17, a part of which is shown in detail in FIG. 3, may be constructed of a relatively strong transparent sheet material, such as a mylar film. The program form 17 contains opaque marks which are disposed in a pattern which corresponds in this instance to the different printing fields on the work form 16 of FIG. 2. By way of example, an opaque mark 24 corresponds to the Feature Description field on the work form 16 of FIG. 2, and a different opaque mark 25 corresponds to the Customer's Reference field on the work form 16.

Most of the opaque areas on the program form 17 are positioned within the printing area of the work form 16, and define the areas in which printing is to be entered. There may, however, be indexing marks outside of the typing area of the work form 16 to provide further control of the functions of the typewriter 10. For example, opaque marks in a left hand column 26, which may be called the "field this line" column provide information to enable the sensing control circuits 21 of FIG. 1 to determine the lines on the program form 17 on which there are fields in which information is to be printed. Marks in an adjacent vertical tabulation column 28, which is also outside the principal typing area on the work form 16, may be used to provide a vertical tabulation function, with an opaque mark at different lines in which a vertical tabulation stop is to be employed. Other indexing and control indicia may also be entered on the program form 17 if desired.

The sensing device 20, best seen in the simplified view of FIG. 4, may include a number of photosensitive elements mounted in a suitable frame structure 30 which is mechanically affixed to the typewriter 10 of FIG. 1. Ten photosensitive elements, 31–40, are mounted in the frame structure 30, and each is diagrammatically shown as a photoconductive resistive element, such as a semiconductive element, the variable resistance of which is indicated in phantom. The photosensitive elements 31–40 are positioned along the central axis of the typewrier carriage 12, and the successive elements are separated by a distance equivalent to the spacing between printing columns on the work form 16. Each of the photosensitive elements 31–40 is disposed on the opposite side of the program form 17 from a different one of a series of light sources 41–50 so that each photosensitive element is in facing relation to a different one of the light sources. Light shielding means (not shown in detail) may be employed to prevent light cross-over and the admission of high ambient light levels. Thus there is a light path (indicated by dotted lines) between each light source, e.g. 41, and the opposed photosensitive element, e.g. 31. The amount of light which is transmitted from a light source to the opposed photosensitive element is controlled by the transparency or opacity of the interposed portion of the program form 17. The photosensitive elements 31–40 and the light sources 41–50 (which may be small electroluminescent blocks) are energized by a current supply 52. It will also be recognized that a single source of distributed light may be used, and that through lens or shielding means, or a combination, each photosensitive element will still be responsive to an individual program form area.

The resistivity of each of the photosensitive elements 31–40 is controlled by the amount of light which impinges upon a particular element. The variations in current flow, and output voltage fluctuations, which are provided in the circuits which include the photosensitive elements 31–40 thus appear on the output conductors. These output conductors, and the signals which they carry, may have the following designations: F, $V_t$, 0, 1, 2, 3, 4, 5, 6 and 7.

Thus it may be seen that, referring now generally to FIGS. 1–4 together, the work form 16 and the program form 17 are fed into the typewriter 10 together. A fixed spatial relationship is maintained between the portion of the work form 16 on which there is to be printing and the portion of the program form 17 which at any point in time is optically scanned by the sensing device 20. A pattern of electrical signals is continually derived due to the contrasting opaque and transparent areas on the program form 17, and this signal pattern is converted by the sensing control circuits and the typewriter control circuits 22 to signals for actuating the typewriter 10 so as to position both the work form 16 and program form 17 as desired. As data is provided from the source 23, the changing signal patterns from the sensing device 20 are utilized to cause the work form 16 to be moved so that desired items are entered only in the preselected printing areas.

Figure 5:
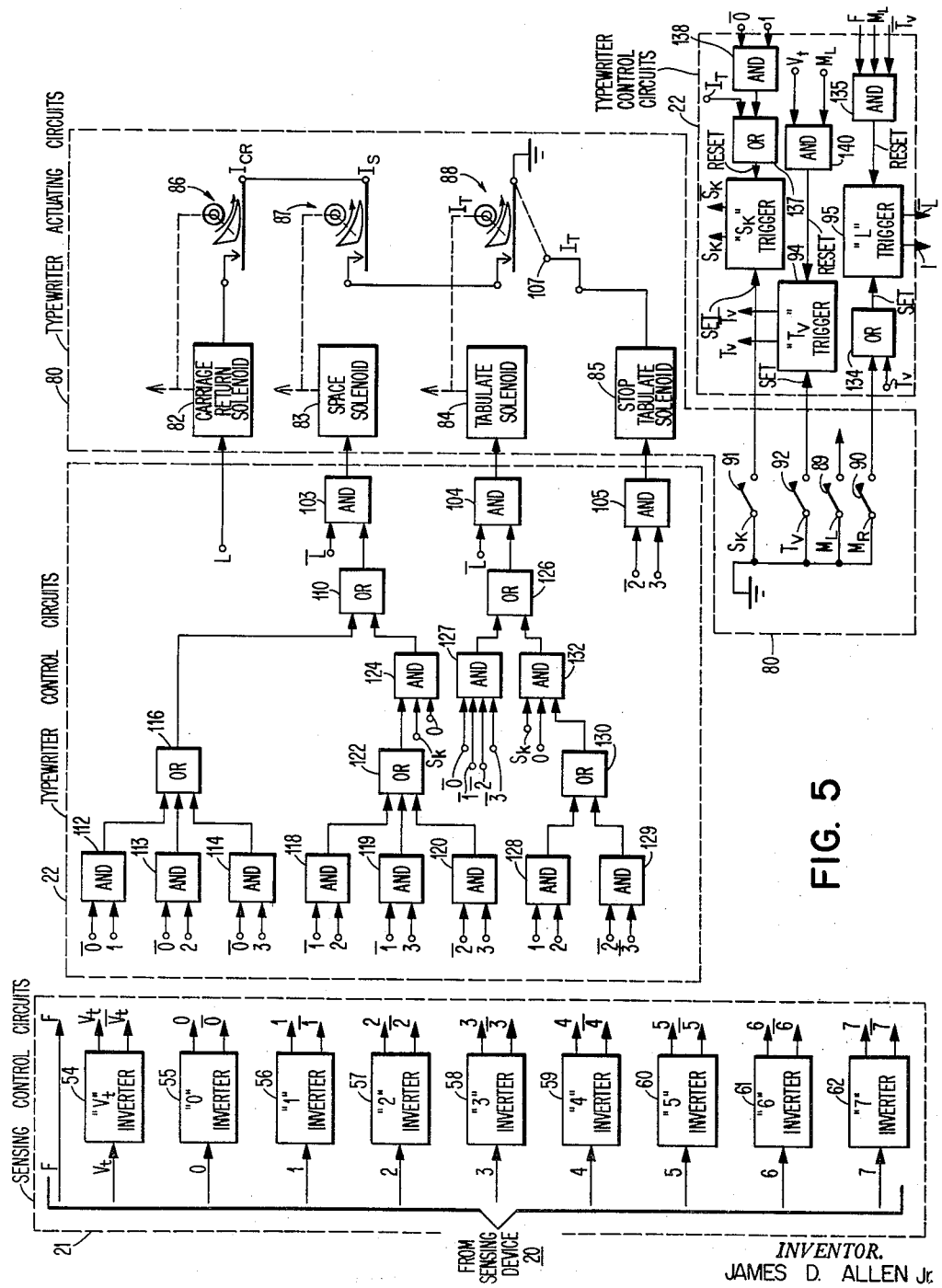
FIG. 5 is a block diagram of a control system which may be employed in accordance with the invention.

Details of the sensing control circuits 21 may be seen by reference to FIG. 5, in which a group of decision circuits coupled to receive the various signals from the sensing device 20 are enclosed in a dashed line rectangle numbered 21. In the sensing control circuits 21 there are employed nine "inverter" circuits 54–62 for providing signals which may be considered to represent true and false indications corresponding, respectively, to opaque and transparent areas on the program form 17 of FIG. 1. As specific example, a "$V_t$" inverter 54 is coupled to receive the $V_t$ signals from the appropriate elements of the sensing device 20 and to provide a true indication, labeled $V_t$, by an appropriate signal when an opaque area is interposed before the associated photosensitive element. Conversely, a false indication, identified $\overline{V}_t$, is provided when a transparent area on the program form 17 is sensed. The convention employed here, for purposes of description is that an inverter, e.g. 54, provides a high signal level on the associated output line $V_t$ or $\overline{V}_t$ to identify the respective true or false indication. This function is provided in response to the changes in the resistance of the photosensitive element (FIG. 4) as controlled by the intensity of the light impinging thereon. Many circuits are known for providing this function, including diode and transistor gating circuits, but a particularly suitable form utilizing electro-optical elements is described in greater detail below. While it is recognized that the sensing of either a transparent or an opaque area may be chosen to indicate the true condition, the opaque areas have been chosen because they designate where typing may properly take place on the work form 16.

No "false" indication is needed for the F signal, but the remaining "0," "1" and remaining signals up to "7" are each directed through an inverter circuit 55—60 to provide the desired true and false indications.

The photosensitive elements which are illustrated in detail in FIG. 4 are disposed column by column opposite the corresponding columns on the program form 17. Referring briefly to FIG. 4, at any position of the typewriter carriage the "0" photosensitive element 33 is disposed opposite the column of the program form 17 which corresponds to the column then opposite the print station 11 (FIG. 1). The "1" photosensitive element 33 is disposed one column to the right so that it scans one column away, on the program form 17, from the column which is at the position equivalent to the print station 11. The successive photoconductors 34–40 for the "2" to "7" positions are similarly disposed in successive columns to the right. The left hand (as viewed in FIG. 4) photosensitive elements 31 and 32, which provide the "F" and "$V_t$" signals, are disposed opposite the left hand columns 26 and 28 (FIG. 3) on the program form 17 when the program form 17 is at its extreme right hand position due to movement of the carriage 12 to its right hand limit. In this position, the "$V_t$" photosensitive element 32 (FIG. 4) scans the vertical tabulation column 28 (FIG. 3) and the "F" photosensitive element 31 scans the column 26 which contains opaque marks to indicate that fields are present in the associated horizontal zones.

Prior to description of the arrangement of the typewriter control circuits 22, it will be useful to have an understanding of the arrangement of certain of the typewriter actuating circuits. The diagram of FIG. 5 includes, in block diagram and simplified form, a part of the typewriter actuating circuits of a conventional electric typewriter 10, as is shown in FIG. 1. The actuating circuits are enclosed in the dashed line rectangle designated 80. While the various solenoids and switches may be assumed to be included within the structure of a typewriter 10, they are shown separately in FIG. 5 in order to establish the interrelationship between the various elements of the sensing control circuits 21 and the typewriter control circuits 22.

Within the typewriter actuating circuits 80 are included four solenoids, designated the "carriage return" solenoid 82, the "space" solenoid 83, the "tabulate" solenoid 84 and the "stop tabulate" solenoid 85. The "carriage return" solenoid 82 causes the carriage (not shown in FIG. 5) to return to the left margin and rotate one line in conventional fashion. The "space" solenoid 83 causes the carriage to move transversely from right to left by one column. The "tabulate" solenoid 84 causes the carriage to move transversely from right to left until a tabulate stop is reached. The "stop tabulate" solenoid 85 may be a modification to a standard electric typewriter in which all of the tabulation stops are set but an electrically operable pawl (not shown) is used. When the pawl is not operated, the typewriter skips over all of the tabulation stops. When the stop tabulate solenoid 85 is actuated, however, the pawl is moved to catch one of the tabulation stops on the fly, thereby arresting the movement of the carriage at a selected point.

Each of the solenoids 82 to 85 contains conventional self-holding arrangements (not shown) which are disengaged upon completion of the functional cycle of the solenoid. In order to prevent erroneous operation and possible damage to the machine, and to provide certain gating functions, there are also provided a group of function interlock switches 86, 87 and 88. Each of these switches 86, 87 and 88 consists of a cam operated switch device, the cam of which is mechanically coupled, as by a rotatable shaft (not shown in detail), to the mechanical output element of the associated solenoid 82, 83 or 84. The function interlock switches 86, 87 and 88 are designated by $I_{CR}$, $I_S$ and $I_T$ respectively, to correspond to the solenoids to which they are individually coupled. When the cam elements of the interlock switches 86, 87 and 88 are not actuated, a complete circuit is provided from the solenoids 82 to 84 to ground. Thus any of the solenoids 82 to 84 may be actuated by an externally applied signal. Once one of the solenoids 82 to 84 is actuated, however, the associated cam operated switch 86, 87 or 88 breaks the series circuit by opening the associated switch arm so that neither of the two other solenoids can be actuated until the first actuated solenoid has completed its function. The circuit of the stop tabulate solenoid 85 is completed through an alternative circuit, which is provided only when the tabulate solenoid 84 has been actuated and the $I_T$ interlock switch 88 operated. Prior operation of the tabulate solenoid 84 is needed in order that the stop tabulate solenoid 85 may interrupt the movement of the carriage at the desired position.

Various other switches which are employed within the typewriter actuating circuits 80 may also conveniently be described here. A left margin or $M_L$ switch 89 and a right margin or $M_R$ switch 90 are included, these being mechanically actuated when the carriage reaches predetermined left and right margin positions. A skip instruction or $S_K$ switch 91 is actuated upon receipt of a skip instruction from the typewriter operator or the associated data source. This causes the typewriter to skip the field in which it is positioned. A $T_V$ switch 92, corresponding to a vertical tabulation instruction, may also be employed. The switches 89 to 92 provide signals which are employed in the typewriter control circuits 22.

The typewriter control circuits 22 include a number of bistable or trigger circuits and a number of "or" and "and" gates which perform decision making operations in response to signals from the sensing control circuits 21 and the typewriter actuating circuits 80. Detailed interconnections between the various elements have not been shown, in order to simplify FIG. 5, but the various input conductors to the circuit elements have been designated to correspond to the signals which appear on them. The principal operative elements in one portion of the typewriter control circuits 22 are grouped together at the right hand side of FIG. 5, and include an $S_K$ trigger circuit 93, a $T_V$ trigger 94 and an L trigger 95, each of which may be set and reset to provide selected signal indications. The $S_K$ trigger 93 provides the $S_K$ signal in response to a skip instruction and the $\overline{S_K}$ signal when the skip instruction is completed. The $T_V$ trigger 94 indicates by a $T_V$ signal the fact that a vertical tabulation instruction has been received, and by the $\overline{T_V}$ signal the fact that the vertical tabulation operation has been completed. The L trigger 95 is responsive to the right margin signals to provide the L signal, indicating operation in a "line search" mode, and provides the $\overline{L}$ signals to indicate that the typewriter is operating in a "column search" mode.

Certain of the gating circuits in the typewriter control circuits 22 are also provided in the right hand rectangle of FIG. 5, but the remainder of the gating circuits are included in the dashed line rectangle which is to the left of the typewriter actuating circuits 80 in FIG. 5. Here the principal operative elements are a group of "and" gates 103, 104 and 105 which have their output terminals coupled to certain solenoids 83 to 85 of the typewriter actuating circuits 80.

The various signal combinations which are utilized in actuating the solenoids 82 and 85 and the triggers 93 to 95 may be summarized in conventional logical equations. The following equations follow the convention shown in the publication "Logical Design of Digital Computers" by Montgomery Phister, Jr., published by Wiley in 1957. Reference may be made specifically to page 255 of the book by Phister for illustrations of equations similar to those following, which identify the various signal patterns needed:

I. Carriage return $= L \cdot \bar{I}_{CR}$

II. Space $= \bar{L} \cdot \bar{I}_S[\bar{0}(1+2+3) = S_K \cdot 0(\bar{1} \cdot 2 + \bar{1} \cdot 3 + \bar{2} \cdot 3)]$ III. Tabulate $= \bar{L} \cdot \bar{I}_T[\bar{0} \cdot \bar{1} \cdot \bar{2} \cdot \bar{3} + S_K \cdot 0(1 \cdot 2 + \bar{2} \cdot 3)]$ IV. Stop tabulate $= I_T \cdot \bar{2} \cdot 3$ V. $L_{set} = M_R + T_V$ VI. $L_{reset} = F \cdot M_L \cdot \bar{T}_V$ VII. $S_{K\ set} = S_K$ VIII. $S_{K\ reset} = \bar{0} \cdot 1 + I_t$ IX. $T_{V\ set} = T_V$ X. $T_{V\ reset} = V_t \cdot M_L$ Of the ten operations involved the first four are concerned with actuation of the four different solenoids 82 to 85 and the remaining six are concerned with the setting and resetting respectively of the three trigger circuits 93 to 95. The explanation of the conditions which exist when the different actuating signals are provided is given below in a sequence which corresponds to the listing of logical equations given above.

I. The carriage return solenoid 82 is actuated by the application of the L signal to the solenoid 82 concurrently with the existence of the $\bar{I}_{CR}$ condition. The generation of the L signal is described in more detail below but the $\bar{I}_{CR}$ condition is satisfied when the $I_{CR}$ switch 86 which is in series with the carriage return solenoid 82 is not actuated. Here the convention adopted is that the normally closed position of the $I_{CR}$ switch 86 represents the $\bar{I}_{CR}$ condition. As long as the L signal persists the carriage return solenoid 82 is repetitively actuated thereby producing the line search mode of the typewriter.

II. The space solenoid 83 is actuated by signals from the "and" gate 103 when three different conditions are satisfied. One condition is that the system be in the column search mode, as represented by the signal $\bar{L}$, and the second condition is that the system not be in space operation, as represented by the normally closed position of the $I_S$ interlock switch 87. The third condition is an alternative condition, as established by the "or" gate 110, one alternative, recognized by the "and" gates 112, 113, 114 and the "or" gate 116, being that the print station 11 of the typewriter 10 (FIG. 1) is at a position which is not within a typing field and the next field is in one of the positions 1, 2 or 3 to the right of the print station 11. The other of the alternative conditions is mechanized by the parallel "and" gates 118, 119 and 120, the coupled "or" gate 122 and the conditioning "and" gate 124. When the typewriter is in a skip mode, as evidenced by the presence of an $S_K$ signal, and at a printing field (evidenced by the 0 signal), and the next field is only two or three columns away, conditions are satisfied which are needed to provide a signal to actuate the space solenoid 83 repetitively until the selected column of the next field is found.

III. Signals are provided to actuate the tabulate solenoid 84 from the typewriter control circuits 22 through the "and" gate 104 provided that the system is in a column search mode, as evidenced by the presence of the L signal, and that the tabulate solenoid 84 is not presently actuated. In addition to the presence of these two conditions, the logical Equation III stated above requires that either of two general relationships obtain, to provide a signal through the "or" circuit 126. One of these conditions is determined by the "and" gate 127 and is that the $\bar{0}$, $\bar{1}$, $\bar{2}$ and $\bar{3}$ signals are provided concurrently, indicating that the scanning device is sensing only transparent areas at those positions. The other condition is determined by the "and" gates 128, 129, the "or" gate 130 and the "and" gate 132. These gates represent the situation in which the typewriter is in the skip mode of operation ($S_K$) and the field is present at the "0" position which corresponds to the print station 11, and the next field beginning is at least three columns away from the present position of the print station 11. Even though the typewriter is in the skip mode of operation, therefore, the tabulate solenoid 84 will be actuated if these conditions are satisfied.

IV. The stop tabulate solenoid 85 is energized by signals from "and" gate 105 when the tabulate solenoid 84 is already in operation, as evidenced by operation of the $I_T$ switch 88 so that a circuit is completed through a terminal 107, and when the "2" position relative to the print station lies outside a field but the column "3" position lies within a field. In effect, during tabulation, the stop tabulate solenoid 85 is actuated three columns before a desired position reaches the print station 11 (FIG. 1).

V. The "L" trigger 95 provides the L signal in response to the $L_{set}$ signal. The "L" signal designates the fact that the typewriter is in a line search mode, and is provided when either the right margin ($M_R$) or the vertical tabulation ($T_V$) signal is applied.

VI. The "L" trigger 95 provides the "$\bar{L}$" signal in response to reset signals derived from the "and" gate 135. These reset signals identify the initiation of the column search mode, and are provided on concurrence of the "F," the "$M_L$" and the "$\bar{T}_V$" signals which establish that an opaque area is present in the left hand column 26 of the program form 17 (FIG. 3) while the typewriter is at the left margin and no vertical tabulation signal is present.

VII. The "$S_K$" trigger 93 is set to provide the "$S_K$" signal in response to actuation of the associated switch 91.

VIII. The "$S_K$" trigger 93 is reset whenever the tabulate solenoid 84 is actuated to provide the $I_T$ signal through an "or" circuit 137. Alternatively, the trigger 93 is reset by signals originating from an "and" gate 138 which indicate that a printing field is not present at the print station 11 (FIG. 1) but that a printing field is present in the next column to the right.

IX. The "$T_V$" trigger 94 is set by the "$T_V$" signals from the switch 92.

X. Reset of the "$T_V$" trigger 94 is effected by signals from "and" gate 140 when the typewriter is at the left margin and an opaque mark is present at the sensing device in the column 28 on the program form 17 (FIG. 3) which aids in vertical tabulation.

Figure 6:
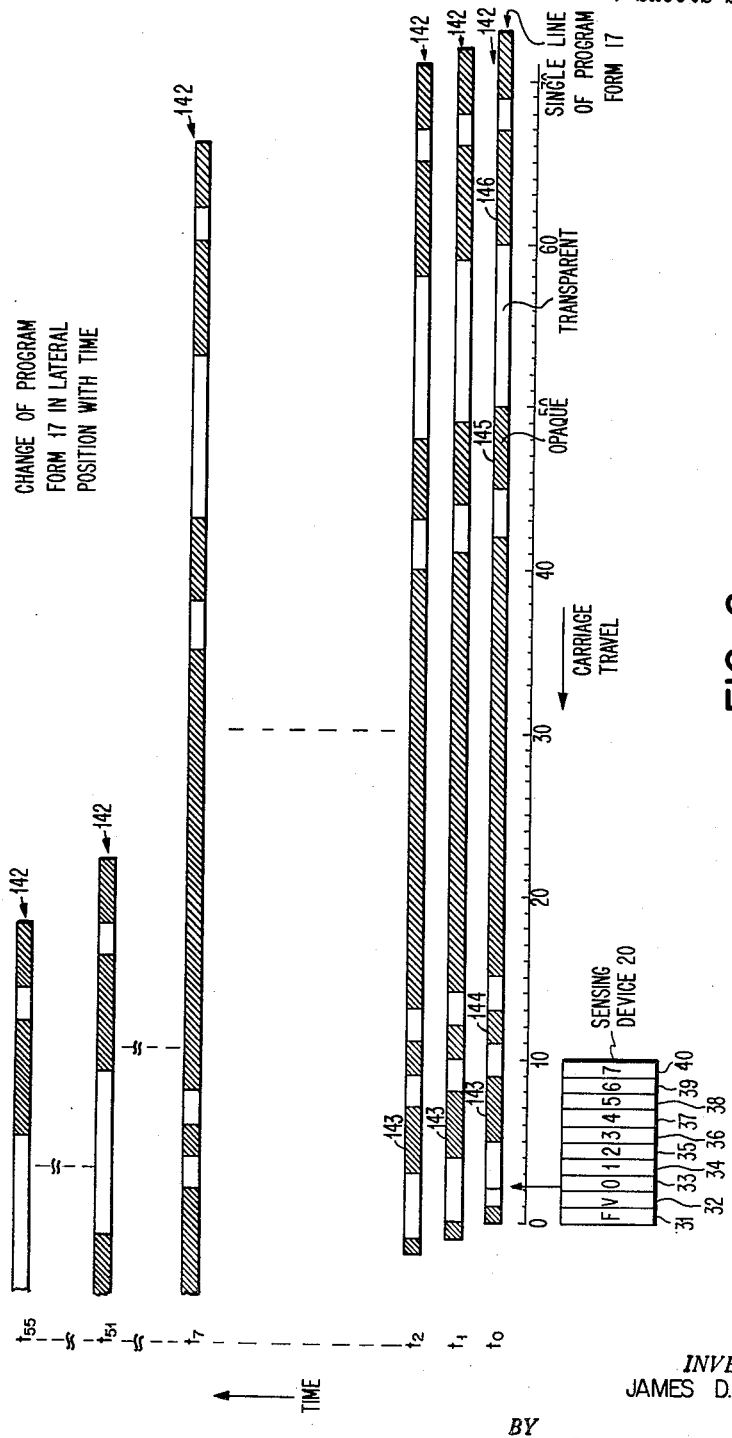
FIG. 6 is a simplified representation of a part of the program form of FIG. 3 and the sensing device of FIG. 4, showing the change in the relative disposition of the program form and the scanning device in the course of system operation.

The operation of the typewriter control circuits 22 of FIG. 5, in conjunction with the sensing control circuits 21 and the typewriter actuating circuits 80, may be better understood by the review of a specific example of a sequence of operations. The sequence which is chosen is that which is carried out for a single line on the program form 17, a line 142 being illustrated in simplified form in FIG. 6. FIG. 6 illustrates the lateral shifting of the line 142 on the program form 17 relative to the sensing device 20, which is also shown in simplified form. In order to show the relative lateral positions of the line 142 most clearly, it is displaced vertically at various sample times $t_0$, $t_1$, $t_7$, $t_{51}$ and the like. Here, for simplicity, a one-to-one relationship has been shown between changes in sample time and changes in column position. Opaque areas on the program form are indicated by appropriately shaded blocks and transparent areas by the absence of shading.

As the sensing device 20 remains fixed, the pattern line 142 moves leftward (as viewed in the drawing) one column for each unit of time. At time $t_0$, the "F" photosensitive element 31 senses an opaque mark, or "field this line" indication in the column 26, the "$V_T$" photosensitive element 32 senses a transparent area in the column 28 but the "2" photosensitive element 35 and others sense the presence of the opaque marks. At later times the opaque marks are interposed between others of the photosensitive elements 31 through 40, in the pattern desired for a given printing format.

As the sensing device 20 begins to scan the selected line 142, at the time $t_0$, the carriage is at its left margin. The "0" photosensitive element 33 is always opposite a position on the program form 17 which corresponds to the position of the print station 11 relative to the work form 16 of FIG. 1. As the "F" photosensitive element 31 senses the "field this line" mark at column 26, the "$M_L$" switch 89 is operated because the carriage is at its left margin, and the concurrent "$\overline{T}_V$" signal (provided in the absence of a vertical tabulation actuation) results in the satisfaction of the conditions of Equation VI above, thus applying a reset signal to the "L" trigger 95. The resultant "$\overline{L}$" output signal from the "L" trigger 95 defines the column search mode and is used to condition certain of the remaining circuits.

Because the "0" photosensitive element 33 senses a transparent area at $t_0$, and the "2" photosensitive element 35 senses an opaque mark, the "and" gate 113 is actuated, providing a pulse through the "or" gates 116 and 110 to the coupled input of the "and" gate 103. Because the $I_S$ or space interlock switch 87 is not actuated at this time, the "$\overline{I}_S$" condition exists, along with the previously described "$\overline{L}$" signal, to fully actuate the "and" gate 103, satisfying the conditions of Equation II above and operating the space solenoid 83. The carriage is thus shifted by a space operation one column to the left, as shown at the time $t_1$.

At time $t_1$, a "$\overline{0}$" signal, and a "1" signal are provided concurrently from the sensing device, thus actuating the "and" gate 112 (FIG. 5) to again actuate the space solenoid 83 so as to space the carriage another position to the left.

At time $t_2$, the "0" photosensitive element 33 first senses a mark 143 which corresponds to the printing field which is now opposite the print station 11 (FIG. 1) and in which data is to be typed. The "0," "1," "2," and "3" signals, each of which indicates the sensing of an opaque area by the "0" to "3" photosensitive elements 33 to 36, are therefore provided at time $t_2$. None of the logical equations which govern the operation of the solenoids 82 to 85 are satisfied, and the typewriter control circuits 22 permit the entry of data in the selected printing field from the source 23 or by an operator. During printing on the work form 16 in the field corresponding to the opaque mark 143, the line 142 moves one column to the left for each unit of time, in the present example. The end of the field is sensed at the time $t_7$ when the "0" photosensitive element 33 faces the transparent area at the right hand end of the mark 143 and the "0" inverter 55 provides the "$\overline{0}$" signal to the "and" gates 112 to 114 (FIG. 5). Because the next opaque mark 144 is only two spaces away, the "3" signal is provided to the "and" gate 114, resulting in the ultimate actuation of the space solenoid 83 as above described. Spacing to the start of the next field is accomplished by the space solenoid 83 and not by the tabulate solenoid 84.

The succeeding sequences of operation proceed in substantially like fashion. An example of a different type of operation may be taken at time $t_{51}$, at which it may be seen that the end of an opaque mark 145 has just passed the "0" photosensitive element 33 and that the next mark 146 is more than three columns away. The typewriter is operating in the line search mode, providing the "$\overline{L}$" signal, and is not tabulating, so that the "$\overline{I}_T$" condition is satisfied. In addition, the sensing device 20 scans only transparent areas, so that the "$\overline{0}$," "$\overline{1}$," "$\overline{2}$" and "$\overline{3}$" signals are provided, fulfilling the necessary conditions of Equation III above to actuate the tabulate solenoid 84. The "and" gate 127, the "or" gate 126 and the "and" gate 104 are successively actuated, and the tabulate solenoid 84 is operated. The carriage therefore moves at rapid speed to the left until the time designated $t_{55}$, when the "3" photosensitive element 36 responds to the next opaque mark 146 and the sensing control circuits provide the "3" signal. In this circumstance, the "$\overline{2}$" signal and "$I_T$" condition are concurrently provided, because the "2" photosensitive element 35 senses a transparent area and the tabulate solenoid 84 is then actuated. The "and" gate 105 is fully energized and the stop tabulate solenoid 85 is operated so that the motion of the carriage is interrupted. The use of three spaces for stopping the carriage on the fly insures that the carriage will not overrun the next field. An appreciable increase in speed is thus realized without introducing the danger of erroneous positioning. When stopping the moving carriage on the fly, it often may happen that the carriage moves one or two positions beyond the desired column. The possible ambiguity this creates is eliminated by scanning the marks a number of positions ahead, stopping the tabulation with a sufficient but not excessive safety margin, and spacing to the desired position.

At the time $t_{55}$, the space solenoid 83 is also actuated as soon as the stop tabulate solenoid 85 has finished acting. The "$\overline{L}$" and "$\overline{I}_S$" signals are concurrently provided, along with the "$\overline{0}$" and "3" signals because of the pattern sensed at the sensing device 20. The necessary conditions for Equation II above are therefore satisfied, and the carriage is successively spaced until the printing field corresponding to the opaque mark 146 is at the printing station 11 (FIG. 1).

This operation continues as described above until such time as the "$M_R$" switch 90 is actuated as in normal typewriter operation to indicate that the right margin has been reached. The "$M_R$" signal is passed through the "or" gate 134 to set the "L" trigger 95 to provide the "L" signal, denoting the line search mode of operation. At this point in time the carriage return solenoid 82 is actuated and the carriage is returned to the right, with the left margin of the work form 16 positioned at the printing station 11, and the carriage is also caused to move vertically to the next line. At the next line, the operation continues with the sensing device 20 scanning the format data on the program form 17 and providing control signals through the sensing control circuits 21 and typewriter control circuits 22 to the typewriter actuating circuits 80.

A number of other useful features are provided by this arrangement. The system may be operating in a printing field, but all of the data intended for that field may have been entered. This situation is likely to arise with alphabetic entries, such as names of persons or things. Here a "skip" instruction is inserted at the end of the item provided from the data source 23. When the "$S_K$" switch 91 is actuated in this manner, or by an operator, the "$S_K$" signal causes the system to space or to tabulate to the next printing field. Space operation is established by the gates 118, 119, 120, 122 and 124 coupled to the space solenoid 83, while tabulate operation is established by the gates 128, 129, 130, 132 which may actuate the tabulate solenoid 84.

Through use of the vertical tabulation column 28 (FIG. 3) and the $V_T$ signals, the printing device may be caused to skip rapidly to a new entry at a different line. After entries have been made in a columnar area, for example, the presence of a vertical tabulation mark permits the skipping of a number of lines to a line at which a total may be entered.

The use of printing fields and of sensing devices which scan a number of the positions in a field allows a considerable simplification in the programming and switching of data for particular entries. Even though variable length items are used, numeric characters may be supplied to the typewriter with right hand justification without a need for special programming or switching circuits, as is described below in conjunction with FIG. 10. The program form corresponds dimensionally and visually to the format of the work form, so that it may be made up by an inexperienced operator. Once having the program form, the programmming of data to be printed out is markedly simplified and reduced.

A number of the automatic features of this arrangement markedly facilitate the programming of data or the entry of data by an operator. When a new work form is entered and the program form is in its initial position, the printing device line spaces until a "field this line" mark is encountered in the appropriate column 26 (FIG. 3). Then the device tabulates or column spaces until the first printing field is found. By coupling back to the data source from the photosensitive elements, the device signals the data source the number of characters required for a numeric field, relieving the data source program of this burden. When an entry has been completed in a printing field, the device again either tabulates or column spaces to the next field, either automatically if the field has been filled or in response to the "skip" signal at the end of the data. When the end of a line is reached, the carriage return operates and the device continues to line space until finding the next line in which a field is present. The same action occurs when the vertical tabulate operation is initiated. When the end of a work form is reached, the operation may continue with the next automatically, if a continuous program form and succession of work forms are used, as in FIG. 13.

Like advantages are derived when arrangements in accordance with the invention are used with a solely operator-controlled system. The operator need concentrate only on the entry of data, and not on proper positioning. If desired, parts of the program form can be omitted, or readily passed over during operation. The result is the attainment of more uniform but higher speed operation.

Figure 7:
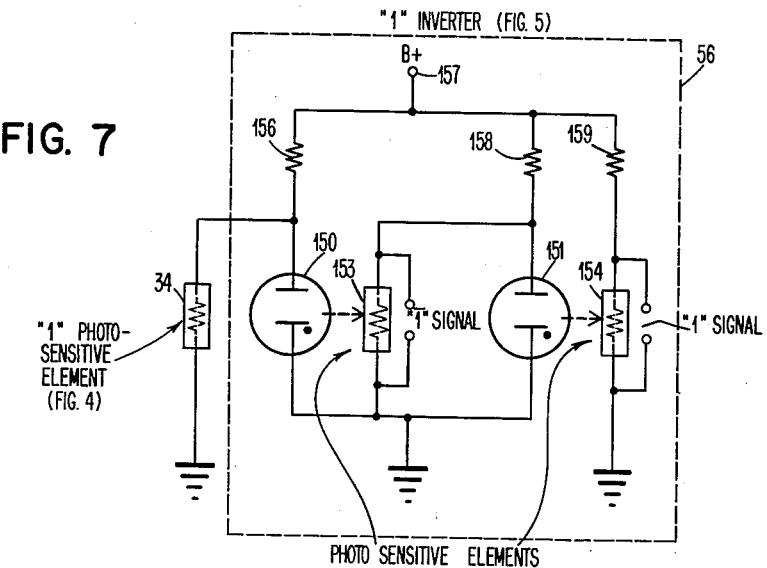
FIGS. 7 and 8 are schematic circuit diagrams of circuits which may be employed in the system of FIG. 5.
Figure 8:
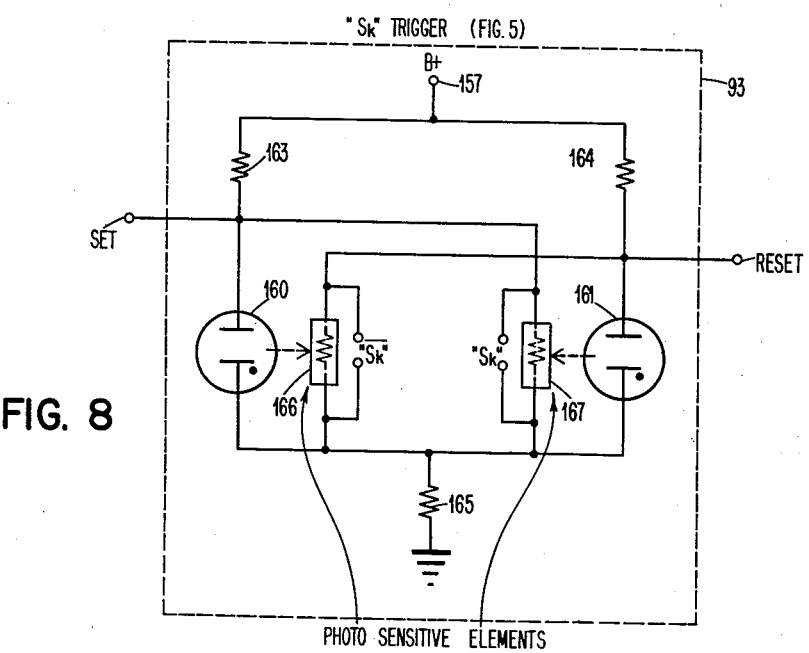

FIGS. 7 and 8 represent circuit arrangements which are particularly useful and suitable in providing the inverter circuits 54 and 62 described in conjunction with the sensing control circuits 21, and the trigger circuits 93—95 described in conjunction with the typewriter control circuits 22. In FIG. 7 the "1" inverter 56 of FIG. 6 is shown in detail as an example. The "1" photosensitive element 34 has one terminal coupled to ground and the other terminal coupled to the input of the "1" inverter 56. The inverter includes a pair of neon lights 150, 151, each of which is operatively associated with a different one of a pair of photosensitive elements 153, 154. For simplicity, means for shielding the paired lights and photosensitive elements 150 and 153, and 151 and 154 have been omitted. A first one of the neon lights 150 has one plate coupled through a resistor 156 to a B+ supply 157 and its other plate coupled to ground. The other light 151 is similarly coupled through a resistor 158 to the B+ supply 157 at one plate, and coupled to ground at the other plate. The photosensitive elements 153 and 154 may be assumed to be photoconductors having a variable resistance property which is dependent upon the amount of light energy falling thereon, with the value of the resistance decreasing with greater light. One of the photosensitive elements 153 is coupled between the resistor 158 and ground, and the other is coupled between a resistor 159 which is coupled to the B+ supply 157, and ground. Terminal connections across each of the photosensitive elements 153 and 154 provide the "$\bar{1}$" signal and the "1" signal respectively in the present arrangement.

In the operation of the circuitry of FIG. 7, when the "1" photosensitive element 34 in the scanning device of FIG. 4 is associated with an opaque mark on the program form 17, the element presents a comparatively high resistance to the flow of current. The point at which the input coupling is made to the inverter circuit 56 is therefore at a comparatively higher potential relative to ground. Accordingly, the first of the neon lights 150 is ignited, causing light energy to fall on the associated photosensitive element 153. The consequent lowering of the resistance of the photosensitive element 153 causes a decrease in the potential of the voltage taken across the element 153, thus lowering the potential across the other of the neon lights 151, causing the light to become extinguished or to remain unlit. The remaining photosensitive element 154 therefore exhibits a high resistance and the voltage taken across it increases. This increase in voltage across the photosensitive element 154 corresponds to the "1" signal. The other of the photosensitive elements 153 conversely provides the "$\bar{1}$" signal when the associated neon light 150 is not ignited due to the presence of a low resistance value in the "1" photosensitive element 34 because of a high light level passing through a transparent area to fall upon the photosensitive element 34. It will be recognized that the logic may be reversed simply by employing the photosensitive elements 153, 154 to provide opposite true and false designations. The latter form of logical designation is used in conjunction with specific circuits of FIG. 9.

The circuit of FIG. 8 illustrates one electro-optical arrangement which may be employed for the triggers of the typewriter control circuits 22 of FIG. 5. The "$S_K$" trigger 93 of FIG. 5 is shown by way of example. A pair of neon lights 160, 161 are connected in a bistable circuit between the B+ supply 157 and ground by a pair of limiting resistors 163 and 164 and a common resistor 165. A pair of photosensitive elements 166 and 167 are employed, one of the photosensitive elements 166 being optically coupled to a first of the neon lights 160, while the second of the photosensitive elements 167 is optically coupled to the other of the neon lights 161. A cross coupling exists, in that the "set" input is coupled both to one plate of one of the neon lights 160 and to one of the terminals of the particular photosensitive element 167 which is optically coupled to the other neon light 161. Similarly, the "reset" input coupling is connected both to one plate of the neon light 161 and one terminal of the opposite photosensitive element 166. The remaining terminals of the photosensitive elements 166, 167 are coupled through the common resistor 165 to ground. Output signals may again be taken across the photosensitive elements 166, 167.

The circuit may be operated by the application of either positive-going or negative-going "set" and "reset" signals. For the sake of uniformity, it will be assumed that positive-going or relatively high level signals are employed for triggering the circuit. Therefore, a high potential signal applied to the "set" terminal causes the first of the neon lights 160 to ignite, lowering the resistance presented by the associated photosensitive element 166 and thereby lowering the potential across the other neon light 161 so that it becomes extinguished. Accordingly, the other of the photosensitive elements 167 exhibits a high resistance and a positive-going variation occurs at the "$S_K$" output terminal, indicating that the trigger 93 is in the "set" condition. The "reset" or "$\bar{S}_K$" state is initiated in a similar manner, by the application of a positive-going "reset" signal.

The circuits above have been described as they may be used with diode or transistor gating circuits. Specifically, the output signals have been assumed to be the voltages existing across a given element coupled to a positive source, and positive-going pulses have been used to provide the useful signal indication. Thus a positive-going pulse has been derived from elements to designate a true condition (e.g. "2") and from other elements to designate a false condition (e.g. "$\bar{2}$"). The system may also advantageously employ electro-optical circuits as the decision elements themselves. Such circuits have adequate response speeds, extremely long life and high reliability, and may be installed on a device both compactly and inexpensively. The manner in which a portion of the arrangement of FIG. 5 may utilize such electro-optical elements in a practical circuit is shown in FIG. 9.

In FIG. 9, photosensitive elements are shown as resistors on which there is a superimposed arcuate line. With such photosensitive elements, "and" functions are provided by the series coupling of a group of such eleelements in parallel. When all the elements are coupled in series with a positive voltage supply, for example, and all of the elements present low resistance concurrently because they are exposed to light, the voltage level applied to an external element at the opposite end of the series of elements from the positive voltage supply is at a relatively high level. When any one of the series connected photosensitive elements is not illuminated, and thus presents a relatively high resistance to the circuit, the voltage level applied to the external device is relatively low and the "and" condition is not satisfied. "Or" functions are provided by coupling the photosensitive elements in parallel. When all the elements are coupled to a positive voltage supply, for example, the "or" condition is satisfied and a relatively high level signal is applied through the elements to an external device when any one of the elements is illuminated so as to present a low resistance in the circuit.

FIG. 9 includes only that part of the arrangement of FIG. 5 which is concerned with the actuation of the carriage return solenoid 82, the space solenoid 83 and the tabulate solenoid 84. Each of the photosensitive elements is disposed so as to be optically coupled to the individual light source of an inverter circuit which generates correspondingly designated signals. For example, all photosensitive elements which are designated "2" are optically coupled to the one light source of the sensing control circuits 21 (FIG. 5) which is designated 2. Those photosensitive elements designated "$\bar{2}$" are separately optically coupled to a "$\bar{2}$" light source. Because it is more convenient to use the relatively low resistance states of the photosensitive elements for providing a useful indication in these series and parallel circuits, the convention used here is the reverse of that employed in the circuits of FIGS. 7 and 8.

In the circuit of FIG. 9, each of the different solenoids 82—84 is energized by a power pulse from a different thyratron 170—172, respectively. The thyratrons 170—172 are in turn energized by relatively high voltage levels applied from a +300 volt supply 174 and an intermediate point of the coupled voltage divider pair of resistors 175, 176 through associated photosensitive element circuits. The examples of these circuits which are given below will suffice to show that in this arrangement they provide the logical equivalent of the Equations I-X previously given.

In the circuit of the carriage return solenoid 82, for example, there is provided a dropping resistor 178 and an "L" photosensitive element 180 arranged in series. Equation I above requires the concurrent existence of the "L" and "$\bar{I}_{CR}$" and here the "L" condition is provided by illumination of the photosensitive element 180, while the "$\bar{I}_{CR}$" condition is provided because the switch 86 (FIG. 5) is not actuated. The photosensitive element 180 thereby presents a low resistance in the circuit, so that the control electrode of the thyratron 170 is raised sufficiently to fire the thyratron 170 and to actuate the carriage return solenoid 82.

Both Equation II above, which governs the operation of the space solenoid 83, and Equation III above, which governs the operation of the tabulate solenoid 84, require the existence of the "$\bar{L}$" condition, and this condition is satisfied by the employment of a "$\bar{L}$" photosensitive element 181 in the circuit to the +300 volt supply 174. As with the carriage return solenoid 82, the "$\bar{I}_s$" and "$\bar{I}_t$" conditions are satisfied by the series coupled switches in the arrangement of FIG. 5.

The manner in which photosensitive elements are used to satisfy the more extensive requirements of Equation II may now be verified by inspection of the circuits coupled to the thyratron 171. One alternative condition for actuation of the space solenoid 83 is expressed as "$\bar{0}(1+2+3)$." The "or" function of this expression may be seen to be satisfied by the photosensitive elements 183, 184 and 185 which are coupled in parallel, while the "and" function is provided by a series-coupled photosensitive element 187.

A voltage dropping resistor 189 is also provided in series to this circuit to achieve proper level adjustment at the control grid of the thyratron 171. Another alternative expression which, when satisfied, causes actuation of the space solenoid 83 is "$S_K \cdot 0 \cdot \bar{1} \cdot 2$," and this is satisfied by the series coupling of the four appropriately designated photosensitive elements 190, 191, 192 and 193. In like manner, the remaining photosensitive elements 195, 196 and 197 which are coupled in the space solenoid 83 circuit may be seen to satisfy other remaining conditions of Equation II and the photosensitive elements which are coupled to the tabulate solenoid 84 may be seen to satisfy the conditions of Equation III.

The example of FIG. 9 is merely illustrative of the electro-optical circuitry which may be employed. In addition to the use of the electro-optical circuits as decision making elements, they may also be employed to provide delay functions and for other purposes. In order to secure proper timing in the operation of the various solenoids 82—85, for example, it may be desired to interpose a short delay through the use of photosensitive elements which are made responsive to the termination of operation of any of the solenoids.

The detailed system described above in conjunction with FIGS. 1-6 has particular advantages, in that the entry of data into the typewriter may be controlled by sensing the patterns on the program form 17. One manner in which such entries may be accomplished is shown in FIG. 10, in which there is represented a character storage register 200 having a number of character positions 201, 202, etc., which are designated here as the $C_1$, $C_2$ . . . $C_7$ character storage elements. For purposes of illustration, the various character storage elements 201, 202, etc. may each be assumed to be multidigit character storages, with the character being represented and stored in binary digits, and with a number of parallel lines being used for each character position although only single lines have been shown for simplicity. The character storage register 200 is here shown as separate from the data source, although it may be an integral part of the data source. Although only seven character positions are shown in the storage register 200, it will be recognized that in actuality the number of character positions would correspond to the maximum total number which are to be expected to be used for any one entry on the work form 16 of FIG. 1.

The output signals from the various character positions of the storage register 200 are sequentially coupled into the typewriter (not shown in FIG. 10) through a switching system which is controlled by signals from the sensing device 20 of FIGS. 1–5. Photosensitive elements, optically coupled with like designations to the elements of the sensing device 20, have low resistivities when actuated. Thus a "0" photosensitive element 205 and a "1" photosensitive element 206 coupled in series with the $C_1$ character position 201 provide a low impedance circuit to the typewriter when an opaque mark is sensed at the "0" position and a transparent area is sensed at the "1" position then presented by the program form to the sensing device 20.

The various photosensitive elements are so arranged that signals from the highest ordered character position in an unbroken series are read out first, and the succeeding character positions are then read out in descending order. If all photosensitive elements from "0" to "6" sense opaque marks, for example, a low impedance path is completed to gate out the character from position $C_7$ to the typewriter. Thereafter, the "$\bar{6}$" photosensitive element presents a low resistance, and character position $C_6$ is read out. Each of the succeeding character positions is thereafter read out into the typewriter in like fashion.

Where the maximum number of characters in a field is less than the number of positions in the character register 200, the desired number for the field is still read out, in proper order. Similarly, no complete circuit to the typewriter is provided through the "0" photosensitive element 205 as long as the "0" photosensitive element 205 is responsive to the sensing of a transparent area on the program form 17. This condition merely indicates, of course, that the work form 16 is not in the proper position for the typing of a selected entry.

In entering the successive characters from the data source in the character storage register 200, the highest order number or character will be entered in the highest order (e.g. $C_7$) position. Therefore the characters will be read out from the storage register 200 correctly, as with the first letter of a name first, or with the highest order number of a multidigit decimal number first. Once the $C_7$ character is printed, the carriage will shift and the "6" photosensitive element in the sensing device 20 will sense a transparent area, so that the "6" switch in the arrangement of FIG. 10 returns to its normal position, thus reading out the character stored in $C_6$ of the storage register 200. This action continues until all of the seven characters shown in the storage register 200 are read out.

The system of FIG. 10 has other significant advantages, in that it permits automatic right hand justification of data on a work form. The operations previously described have involved left hand justification, that is, alignment with the left margins of the printing fields. While left hand justification is usually employed with alphabetic data, right hand justification is usually used with numeric data. Right hand justification is often more difficult to achieve. It may be desired, for example, to print out decimal numbers in a given field, with their least significant digits aligned, even though the register containing the numbers has a greater length than allotted for the field. In this instance the printing device operates as desired, whether or not the sensing device extends across more than one printing field.

If the character register 200 is filled with seven decimal numbers, for example, but only three numbers are to be printed in a given field, the opaque mark extends across three printing positions. The sensing device and control circuits provide signals in the pattern 0, 1, 2, $\bar{3}$. Thus the $C_3$ character is read first and followed by the $C_2$ and $C_1$ characters because the photosensitive elements at the "2" and "1" positions successively sense transparent areas. The contents of the register, above character $C_3$, do not affect this operation.

Various other arrangements may also be employed for sensing the patterns disposed on a program form concurrently with the operation of the printing device. Referring now to the arrangement of FIGS. 11 and 12, there is shown a printing device control system employing a sensing device 220 which includes a stationary program form sensing array. The overall arrangement of the system is shown in FIG. 11, and the details of the stationary array 220 are shown in FIG. 12. In FIG. 11, a printing device such as an electric typewriter 10 in which may be mounted a work form 16 is provided with a signal generator which indicates the vertical positioning of the work form 16 relative to the printing station 11. Vertical starwheels coupled to the line shifting mechanism of the typewriter may provide this information. Here the vertical program information is provided by a program tape 222 coupled to be driven by the roller on which the work form 16 is mounted. The program tape 222 may be a punched paper, metal or plastic tape, or have contrasting opaque and transparent markings. A light source 223 and a tape reader 224 are disposed on opposite sides of the program tape 222, and derive signals which designate, in accordance with the coded patterns on the tape 222, the printing line of the work form 16 which is then at the print station 11.

Signals from the tape reader 224 are applied to a single line selector 226 which is coupled to select one horizontal line of the stationary array 220, in response to the code read from the program tape 222. The single line selector 226 may be a converter circuit of any of the well known types, for converting from the program tape code to a "one out of a number" code in which only one of the horizontal lines for the stationary array 220 is energized.

The stationary array 220 also has a number of vertical conductors, which are defined by vertical photoconductive elements described in more detail in conjunction with FIG. 12. These vertical conductors are each coupled to a different one of a number of external contacts 228. A selector device 230 which is mechanically coupled to move laterally with the carriage of the typewriter 10 may then make contact with selected ones of the contact points 228, completing circuits between the vertical conductors of the stationary array 220 and sensing control circuits 221, as described above in conjunction with FIGS. 1 and 5. The sensing control circuits 21 may be coupled through typewriter control circuits 22 to a character storage register 200 (FIG. 10) and also to appropriate control elements of the typewriter 10. Signals from the data source 23 may be provided through the character storage register 200 under command of signals from the control circuits 21 and 22, and the various command signals from the typewriter control circuits 22 may also be applied directly to the space, tabulate, stop tabulate and carriage return solenoids (not shown in FIG. 11) of the typewriter 10.

The stationary array 220, best seen in FIG. 12, consists of three planar members, one of which has a planar light source element 232 on which are disposed horizontal (as viewed in FIG. 12) electroluminescent stripes 233 corresponding in direction to the lines of the work form 16. The intermediate planar element is the program form 17 having contrasting opaque and transparent areas as above described. On the opposite side of the program form 17 from the planar light source element is a planar, segmented photosensitive element 236, in which the photosensitive portions are provided by photoconductive stripes 237 which are vertically disposed (as viewed in FIG. 12) and which correspond in direction to the column positions on the work form 16 of FIG. 11. In order to simplify the drawings, the number of electroluminescent stripes 223 and the number of photoconductive stripes 237 have been greatly reduced, and the spacings between the various stripes have been increased over what may be employed in the actual installation.

In the operation of the arrangement of FIGS. 11 and 12, a work form 17 is placed between the light source element 232 and the segmented photosensitive element 236. In response to the signals from the tape reader 224, the single line selector 226 energizes the electroluminescent stripes 233 one at a time, corresponding to the line of work form 16 which is then at the print station 11. The code represented by the opaque marks on the program form 17 and the position of the selector device 230 determine the signals which are applied through the sensing control circuits 21 and the typewriter control circuits 22 to the typewriter 10 and the character storage register 200. As in the arrangement of FIGS. 1–5, signal sequences are generated by which the program form 17 pattern is followed in selecting positions for the printing fields on the work form 16. For a given energized electroluminescent stripe 233, only certain of the photoconductive stripes 237 receive light, as determined by the opaque marks on the program form 17, and only certain signal patterns are provided through the selector device 230 to control the typewriter 10.

A number of alternatives will suggest themselves to those skilled in the art with respect to the arrangement of FIGS. 11 and 12. Thus a vertical program tape 222 need not be employed if starwheels or mechanical elements are provided in the typewriter to indicate a starting position for a work form, and succeeding line changes in the position of the work form. Similarly, switching circuits responsive to the column position of the carriage of the typewriter 10 may be used to select the different columns of the stationary array 220 in response to the movement of the carriage.

A different arrangement is shown, in FIG. 13, for the work form 16, the program form 17 and the sensing device 20. In this arrangement, the program form 17 is an endless belt which is driven by the typewriter roller 240 between the typewriter roller and an externally mounted idler roller 241. The program form 17 is interposed between the typewriter roller 240 and an essentially continuous strip of stock material on which the work form 16 is to be printed. Thus the program form 17 provides a backing for the action of the printing device against the work form 16. At a point spaced apart from the print station, the program form 17 is passed between sensing elements 243 and a light source 244 which together comprise a sensing device 20, as above described. The position of the pattern on the program form 17 is of course displaced relative to the printing fields to be disposed on the work form 16, so that the pattern sensed by the sensing device 20 will correspond to that presented at the print station. With this arrangement, a number of different documents may be provided which correspond to the same program form 17. A number of purchase orders of the same general format may be printed out, for example, as fast as the printing device can operate in response to signals from an external data source.

Alternatively, where the program form 17 is not of such type as will withstand the action of the printing device, the typewriter roller 240 may be removed and a guide system may be substituted for the program form 17 and the work form 16, and a relatively thin platen serving as a backing for the mechanical action of the printing device may be interposed between the work form 16 and the program form 17 at a point adjacent the print station. It should also be recognized that the alternatives described in FIGS. 11 and 12 and FIG. 13 may be utilized in various other combinations. The long supply form and endless belt type of program form may be used in the arrangement of FIG. 1, for example. Where the endless belt type of program form is employed, special provisions may be made in the mounting elements so as to provide for ready interchangeability.

The different arrangements shown in FIGS. 1, 11, 12 and 13 merely serve to illustrate the general applicability of format control devices in accordance with the invention. A number of other known printing systems, for example, maintain the work form stationary, or move the work form only between successive lines while the printing mechanism is shifted to provide the relative movement which is needed. Single or multiple rotary printing wheels are employed for this purpose. In these arrangements also, the program form may be held in a fixed column-by-column and line-by-line relationship to the work form, with the scanning device being held in fixed relation to the print station, which is the position of the printing mechanism. The program form, for these purposes, may be detachably wrapped around a rotatable transparent drum which includes a central, axial, line light source. The drum may be turned with the work form as an external sensing device changes column positions with the printing mechanism.

While there have been described above and illustrated in the drawings various arrangements for providing automatic control of the format provided by a printing device, it will be appreciated that the invention is not limited to the specific arrangements shown. Accordingly, the invention should be considered to include all modifications, variations and equivalent arrangements falling within the scope of the annexed claims.

What is claimed is:

1. A printing device having selectively energizable horizontal positioning controls and selectively energizable vertical positioning controls and operating to enter data within only selected printing fields on a selectively movable work form, including the combination of a program form having a real program indicia disposed thereon at horizontal and vertical positions defining the pattern desired for the printing fields, means responsive to the positioning of the selectively movable work form and adjacent the program form for sensing program indicia thereon at a number of horizontal positions concurrently, and circuit means coupled to the means for sensing and the selectively energizable horizontal and vertical positioning controls of the printing device for selectively energizing the controls to move the work form horizontally and vertically between successive printing fields in a sequence dependent upon the sensed indicia.

2. A printing device including selectively energizable positioning controls for the horizontal and vertical positioning of a work form, the printing device operating to enter data within only selected printing fields on the work form, including a program form having program indicia disposed thereon in a pattern corresponding to that desired for the printing fields, the program form including indexing indicia, means responsive to the position of the work form and adjacent the program form for concurrently sensing the pattern of the indicia on the program form at a number of positions dependent upon the position of the work form in the printing device, and gating circuit means coupled to the means for sensing and to the selectively energizable positioning controls for horizontally and vertically positioning the work form at the different successive printing fields in a sequence determined by the indexing indicia and the program indicia sensed by the means for sensing.

3. A printing system having a print station for entering printed data in a selected format of line and columnar positions on a work form, there being relative movement between the work form and print station, including a transparent program form having opaque indicia defining the printing areas of the selected format, sensing means disposed adjacent the program form for scanning the relative opacity of a number of successive columnar positions of the program form concurrently, means responsive to the relative position between the work form and the print station for controlling the sensing means to govern the region in which the columnar positions of the program form are sensed, means for positioning the work form at selected lines in response to the sensed program form positions, and means for moving the work form to selected columnar positions in response to a number of sensed program form positions.

4. A printing system including a printing device having a movable element and a print station for entering data in a selected format on a work form which is movable relative to the print station, the printing device including tabulating and spacing controls for horizontal positioning, the system including a program form having a real indicia defining the selected format, means disposed adjacent the program form and responsive to the movement of the movable element of the printing device for sensing a number of positions of the program form concurrently, the sensed positions corresponding to the relationship of the work form to the print station, means coupled to the printing device and responsive to the sensing means for operating the tabulating control when the pattern sensed on the program form indicates that the next printing field on the work form is more than a selected number of positions away from the print station, means coupled to the printing device and responsive to the sensing means for interrupting the tabulating action when the pattern sensed on the program form indicates that the next printing field on the work form is a selected number of positions away from the print station, and means coupled to the printing device and responsive to the means for sensing for operating the spacing control when the pattern sensed on the program form indicates that the next printing field on the work form is less than the selected number of positions away from the print station.

5. In a typewriter having a print station and a work form with printing lines and columns adjacent the print station, and including a carriage for effecting relative movement between the work form and the print station, the combination including a program form having contrasting opaque and transparent areas in a pattern corresponding to a desired format, a contrasting area of one type defining the limits of a printing field desired for the work form, the program form being coupled to move in fixed relation to the work form as the work form moves relative to the print station, optical sensing means disposed adjacent the program form and in fixed relation to the print station, said optical sensing means being operable to sense contrasts between the areas at a number of successive positions on the program form equivalent to printing columns on the work form, and means responsive to the optical sensing means for controlling the movement of the carriage in accordance with the pattern sensed by the optical sensing means at a number of different positions.

6. In a typewriter having a tabulating control and a space control, and including a print station and a carriage adapted to receive a work form on which data may be printed in lines and columns as the work form moves past the print station, the combination including a program form having contrasting opaque and transparent areas in a pattern corresponding to a desired format for the entry of printing fields on the work form, the contrasting areas also including marginal indexing areas, the program form being coupled to move in fixed relation to the work form and relative to the print station, optical sensing means disposed in fixed relation to the print station and adjacent the program form for sensing the contrasting areas at a number of positions on the program form equivalent to a number of successive printing columns on the work form, and means coupled to the optical sensing means and to the tabulating and space controls of the typewriter for selectively operating the tabulating and space controls in accordance with the relative spacing between the position of the work form relative to the print station and the next desired printing field.

7. In a typewriter including carriage return, space, and tabulating controls, and a carriage movable in response to the controls to position a work form relative to a print station, with data to be entered on the work form in printing lines and printing columns, the combination including a program form having contrasting opaque and transparent areas in a pattern corresponding to a desired format for the printing fields on the work form, the opaque areas defining the desired limits of a printing field, the program form being coupled to move in fixed relation to the work form as the work form moves relative to the print station, a number of optical sensing means disposed in fixed relation to the print station, each of the optical sensing means being adjacent the program form and at successive positions corresponding to successive printing column positions along a printing line on the work form, gating circuit means responsive to the optical sensing means and coupled to the tabulating control of the typewriter for operating the tabulating control to move the carriage rapidly when the next desired printing field is at a position more than a selected number of printing columns away on the work form, gating circuit means responsive to the optical sensing means and coupled to the tabulating control of the typewriter for stopping the tabulating action of the carriage when the next desired printing field on the work form is a selected number of printing columns away from the print station, and means responsive to the optical sensing means for operating the space control when the next desired printing field on the work form is less than the selected number of printing columns away from the print station.

8. In a typewriter including tabulating, stop tabulating, space and carriage return controls, and a carriage adapted to support a work form and movable horizontally and vertically relative to a print station to enter data in printing columns on printing lines at the print station, the combination including a program form having contrasting opaque and transparent areas in a pattern corresponding to the desired format for printing fields to be entered by the typewriter, the program form being coupled to the carriage to move in fixed relation to the work form as the work form moves relative to the print station, optical sensing means including a number of photosensitive elements disposed in fixed relation to the print station and adjacent the program form, the photosensitive elements scanning a number of successive positions on the program form equivalent to successive printing columns on the work form, the program form also including contrasting indexing areas denoting the absence of a printing field in a selected printing line, and vertical tabulation positions, first gating circuit means coupled to the carriage return control of the typewriter and responsive to the photosensitive elements for operating the carriage return control in accordance with the indexing areas, second gating circuit means coupled to the tabulating control and responsive to the photosensitive elements for operating the tabulating control when the contrasting areas of the program form establish that the next desired printing field on the work form is greater than a selected number of printing columns away from the print station, third gating circuit means coupled to the stop tabulating control of the typewriter and responsive to the photosensitive elements for interrupting the tabulating function when the contrasting areas on the program form establish that the next printing field on the work form is at the selected number of printing columns away from the print station, and fourth gating circuit means coupled to the space control and responsive to the photosensitive elements for operating the space control when the contrasting areas on the program form establish that the next printing field on the work form is less than the selected number of printing columns away from the print station.

9. A system for controlling the entry of data on a work form by a printing device including the combination of a program form having indicia thereon designating by contrasting areas the limits of printing fields desired for the work form, means adjacent the program form and coupled for operation with the printing device for scanning selected areas on the program form corresponding to printing areas on the work form, said scanning means being disposed to scan a number of positions on the program form, gating circuit means responsive to the scanning means and coupled to the printing device for operating the printing device to select positions at the start of selected printing fields on the work form, and data switching means responsive to the scanning means for successively gating data to the printing device in accordance with changes in the contrasting areas of the program form scanned by the scanning means.

10. A system for controlling the entry of data on a work form with right hand justification by a printing device including the combination of a program form dimensionally corresponding to the work form having indicia thereon designating by optically contrasting areas the areas of printing field desired for the work form, optical scanning means adjacent the program form and coupled to the printing device for sensing a selected number of positions on the program form corresponding to successive printing positions on the work form, gating circuit means responsive to the scanning means and coupled to the printing device for operating the printing device to position the work form at the start of selected printing fields on the work form, a data register having a number of positions, and data switching means coupled to the scanning means and the data register and responsive to the length of the area of the program form corresponding to the printing field then being entered for selectively and successively coupling data signals to the printing device from the register.

11. A system for selectively positioning a work form relative to a printing device and actuating the printing device with data signals from a data source including the combination of a program form having indicia thereon representing printing fields desired for the work form, sensing means adjacent the program form and coupled to sense the indicia at a number of positions on the program form determined by the point on the work form then being operated on by the printing device, a data register coupled to receive data from the source, gating circuit means responsive to the sensing means and coupled to provide relative positioning of the work form at the start of successive printing fields in response to indicia sensed by the sensing means from the program form, and switching means coupled to the data register and responsive to indicia sensed by the sensing means for selectively switching data from the data register once the relative position of the work form has been established at the start of a printing field.

12. A system for selectively positioning a work form relative to a typewriter and actuating the typewriter with character signals from a data source including the combination of a program form having indicia thereon representing printing fields desired for the work form, the indicia being in the form of optically uniform blocks defining printing fields, optical sensing means adjacent the program form and coupled to sense the indicia at a number of adjacent column positions on the program form corresponding to the point on the work form then at the print station of the typewriter, a character register coupled to receive characters from the source, gating circuit means responsive to the sensing means and coupled to position the work form at the start of successive printing fields in response to indicia sensed by the sensing means from the program form, and switching means coupled to the typewriter and the character register and responsive to indicia sensed by the sensing means for selectively passing characters from the register in accordance with the position of the end of the block on the program form corresponding to the printing field to provide right hand justification of a uniform number of characters.

13. A system for controlling the operation of a printing device including an element which is both verically and horizontally movable, so as to position the work form of the printing device at selected printing fields in accordance with a selected format, including the combination of an electro-optical scanning array including a first planar member, a second planar member disposed in facing relation to the first planar member, and a program form having the desired format defined by contrasting transparent and opaque areas thereon interposed between the first and second planar members, the first planar member including light emitting stripes disposed in one coordinate therealong, the second planar member including photosensitive stripes disposed in a second coordinate normal to the first therealong, signal conversion means responsive to the movement of the movable element of the printing device in one selected direction for successively energizing the light emitting stripes of the first planar member, signal switching means responsive to movement of the movable element of the printing device in the other coordinate direction for selectively switching signals from the photosensitive stripes of the second planar member in response to the movement of the movable element of the printing device in the other coordinate direction, and means responsive to the signals switched from the second planar member for controlling the horizontal and vertical positioning of the movable element of the printing device.

14. A printing device having selectively energizable positioning controls including vertical positioning and relatively fast and slow horizontal positioning controls and operating to enter data at successive positions within selected printing fields on a selectively movable work form, including the combination of a program form having optical program indicia defined by contrasting transparent and opaque areas disposed thereon a pattern corresponding to that desired for the printing fields, photosensitive means responsive to the positioning of the selectively movable work form and adjacent the program form for sensing program indicia thereon at a number of positions concurrently, and circuit means coupled to the photosensitive means and the selectively energizable positioning controls of the printing device for selectively energizing the controls to move the work form between successive printing fields on vertically disposed lines at relatively fast or slow rates depending upon the sensed indicia.

15. A printing system for entering data in a selected format on a work form, including a printing device having horizontal and vertical controls for selectively moving the work form relative to a print station, a program form having optical indicia defining the selected format by contrasting areas whose boundaries correspond to the printing field boundaries, photosensitive means disposed adjacent the program form for sensing the indicia on a region of the program form, a means responsive to the position of the work form relative to the print station for controlling the means for sensing to govern the region in which the program form is sensed, and means coupled to provide different control signals to the printing device to position the work form at the start of successive printing fields in accordance with the indicia sensed on the program form.

16. A printing system for entering data within selected printing fields on a selectively movable work form, including the combination of a printing device having a print station relative to which the work form is moved, a program form having program indicia disposed thereon in vertical and horizontal patterns corresponding to the pattern desired for the printing fields, the program form also including vertical indexing indicia, means for concurrently sensing the indicia at a number of positions on the program form in regions corresponding to the part of the work form adjacent the print station, and circuit means coupled to the means for sensing and to the printing device for selectively providing control signals to the printing device to position the work form at the start of successive printing fields dependent upon the sensed indicia.

References Cited in the file of this patent

UNITED STATES PATENTS

| | | |
|---|---|---|
| 2,564,580 | Pentecost et al. | Aug. 14, 1951 |
| 2,747,717 | Cunningham et al. | May 29, 1956 |
| 2,842,248 | Saltz et al. | July 8, 1958 |
| 2,936,871 | Cummins | May 17, 1960 |

UNITED STATES PATENT OFFICE
CERTIFICATE OF CORRECTION

Patent No. 3,063,537                          November 13, 1962

James D. Allen, Jr.

It is hereby certified that error appears in the above numbered patent requiring correction and that the said Letters Patent should read as corrected below.

Column 6, line 69, for "and", first occurrence, read -- to --; column 12, lines 73 and 74, for "ele-elements in parallel. When all the elements are coupled" read -- elements. When the photosensitive elements are coupled --; column 16, line 51, after "of" insert -- the --; column 22, line 15, after "thereon" insert -- in --; line 25, for "depending" read -- dependent --; column 22, line 27, for "15." read -- 16. --; line 43, for "16." read -- 15. --.

Signed and sealed this 23rd day of July 1963.

(SEAL)
:test:

NEST W. SWIDER                                          DAVID L. LADD
:testing Officer                                          Commissioner of Patents